Figure 1:
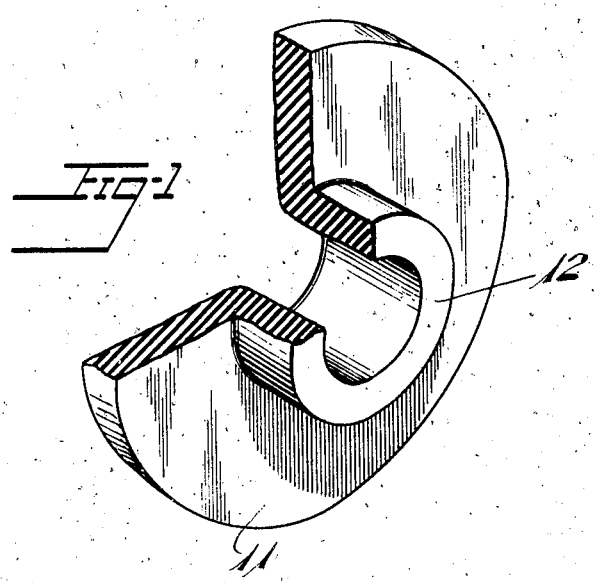

Oct. 25, 1938.   F. L. HAUSHALTER   2,134,302
GASKET

Filed Nov. 19, 1936

Inventor
Fred L. Haushalter
By Willis F. Avery
Atty.

Patented Oct. 25, 1938

2,134,302

UNITED STATES PATENT OFFICE 2,134,302

GASKET

Fred L. Haushalter, Akron, Ohio, assignor to The B. F. Goodrich Company, New York, N. Y., a corporation of New York Application November 19, 1936, Serial No. 111,636

3 Claims. (Cl. 288—1)

This invention relates to gaskets which are used to prevent leakage along a piston rod, shaft, or other moving part that passes through a hole in a cylinder or other vessel containing water, oil, grease, or air, and has among its objects to provide gaskets which will not swell or soften in contact with oil or water, and which will be non-porous and abrasion-resistant.

In many kinds of machinery, the problem of surrounding a piston rod, shaft, or other moving part with a gasket to insure fluid tightness appears. Of the many gasket materials which have been used, leather has found the widest application. But even though it has been widely used, it has always had several disadvantages, among which is the fact that it is more or less porous. Since it is not impervious to water and oil, it becomes permeated and has a tendency to soften and not fit the moving part as tightly as it did when it was installed. This makes it necessary to replace the gaskets frequently.

One of the types of gaskets frequently used had an annular shoulder on the inside of the gasket through which the moving part passed. These gaskets were molded out of leather by a press. Though leather can be cut to form a sheet gasket, it is obviously not a material ideally suited to being molded into a gasket with a shoulder. The gaskets were not uniform in size, and the small variations which inevitably occurred because of the nature of the leather contributed much to the unreliability of the finished products.

These gaskets were sometimes made of cork, and were subject to many of the same disadvantages. They were porous, and suffered from irregularities in dimensions. In hydraulic shock absorbers, for instance, it was accepted as a matter of course that when cork oil seals were used they would soon become leaky and have to be replaced. Many kinds of laminated gaskets have been tested at different times, but they did not have sufficient merit to replace the leather and cork gaskets of the type which is the subject of this application.

I have found that gaskets may be made from the plasticized gamma polyvinyl chloride described in Patent No. 1,929,453 issued to Waldo L. Semon on October 10, 1933, and that it is a material much better suited for these gaskets than any material heretofore extensively used. It is very readily molded, and the dimensions of the molded products are unusually uniform. The fact that it is a non-porous solid makes it valuable for use as gaskets. It has remarkable abrasion resistance. Its resistance to water, oil, and deterioration in the air makes it possible to use it in a great variety of gaskets and imparts to the gasket an unusually long life.

As a specific example of a typical use of plasticized gamma polyvinyl chloride as a gasket material for a movable shaft, I have represented its application to a hydraulic shock absorber in the accompanying drawing, wherein Fig. 1 is a perspective view of the gasket used in the sealing member.

Figure 2:
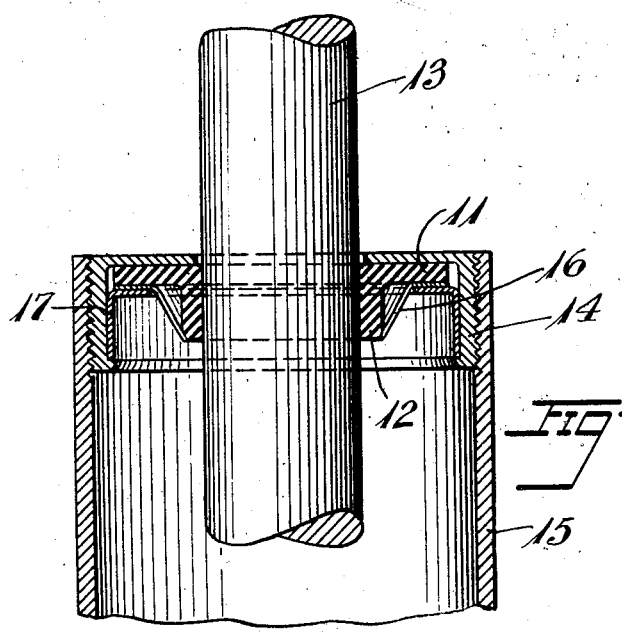

Fig. 2 is a sectional drawing illustrating the use of the gasket as an oil seal in a hydraulic shock absorber.

Referring more in detail to the drawing—the gasket consists of an outer skirt 11 within which is an annular, sleeve-like shoulder 12 through which the shaft 13 passes. In assembling the shock absorber, the gasket is placed in a holder 14 which is screwed into the top of the oil reservoir 15. Over the gasket is placed the finger spring 16 and the flange washer 17, over which is bent the edge of the holder 14, thus forming a sealing member which tightly holds the gasket in place.

To make the gaskets, I mix 100 parts by weight of gamma polyvinyl chloride with 75 parts of tricresyl phosphate at an elevated temperature. I place this composition in a mold in a press, and heat for eight minutes to 300°–306° F. I allow the gaskets to cool in the mold for ten minutes before I remove them. In this way, I very easily produce gaskets of extremely uniform size and quality.

The gasket which results from this process is quite pliable, and is easily applied to the rod. After months of service with water, the properties of the gasket are practically unchanged. This is not true of leather gaskets, as their porosity allows them to become permeated with water. When plasticized gamma polyvinyl chloride is used as an oil seal, however, it has an advantage which is even greater than any heretofore mentioned. I have already described the softening effect of oil and grease upon leather, and the necessity for replacements due to the loosening of the leather about the shaft. But when plasticized gamma polyvinyl chloride is used as an oil seal, the oil extracts some of the plasticizer, and the gasket becomes stiffer and shrinks, thus making a seal which is tighter than when the gasket was applied. Thus, I have made a gasket which instead of deteriorating under service actually improves with use. This hardening and tightening effect is usually observed wherever the plasticized gamma polyvinyl chloride is used on a shaft as an oil seal. Care should be exercised in the selection of the proper plasticizer for oil service, however, for certain plasticizers such as dibutyl phthalate are so soluble in oil that the gasket eventually loses so much plasticizer that it becomes too stiff.

When making gaskets, one part by weight of gamma polyvinyl chloride is usually combined with one part or less of plasticizer. Many different plasticizers besides the tricresyl phosphate mentioned in the illustration may be used to vary the properties of the finished products. Other substances may be added to the gamma polyvinyl chloride compositions such as carbon black, zinc oxide, clay, and other pigments and fillers commonly used in the rubber industry.

It is obvious to anyone skilled in the art that the use of plasticized gamma polyvinyl chloride as a gasket material is capable of wide variation. I do not intend to limit the scope of my invention by the example used for specific illustration, but wish to claim broadly the use of plasticized gamma polyvinyl chloride as a gasket material around movable shafts to prevent the passage of fluid along the shaft. The motion of the shaft may be reciprocatory or rotary. Examples of uses to which the gaskets may be put include use on double action oil, water, and air pumps, oil well machinery such as oil-well pack-off gaskets, use as grease gun packings and transformer gaskets. They are useful as oil seals in general, such as hydraulic brake packings and oil seals on bearings.

I claim:

1. A plasticized gamma polyvinyl chloride sealing ring as an oil seal on the shaft of a hydraulic shock absorber.

2. A resilient sealing ring comprising a shaft-engaging portion and an annular flange, said sealing ring being made of plasticized gamma polyvinyl chloride.

3. A resilient sealing ring comprising a shaft-engaging portion and an annular flange, said sealing ring being made of gamma polyvinyl chloride plasticized with from one-half to one part by weight of tricresyl phosphate.

FRED L. HAUSHALTER.